(12) United States Patent
Kishi

(10) Patent No.: US 8,238,686 B2
(45) Date of Patent: Aug. 7, 2012

(54) IMAGE PROCESSING APPARATUS, METHOD AND RECORDING MEDIUM

(75) Inventor: Hiroki Kishi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 12/369,357

(22) Filed: Feb. 11, 2009

(65) Prior Publication Data

US 2009/0208130 A1      Aug. 20, 2009

(30) Foreign Application Priority Data

Feb. 14, 2008   (JP) ................. 2008-033625

(51) Int. Cl.
    *G06K 9/40* (2006.01)
(52) U.S. Cl. ........ 382/266; 382/274; 382/275; 382/282; 358/3.26; 358/3.27; 358/463
(58) Field of Classification Search .......... 382/260, 382/266, 274, 275, 282; 358/3.26, 3.27, 358/463
    See application file for complete search history.

(56) References Cited

U.S. PATENT DOCUMENTS

| 5,644,654 | A | 7/1997 | Onokera |
| 5,878,161 | A | 3/1999 | Ishida et al. ................. 382/198 |
| 6,404,921 | B1 | 6/2002 | Ishida ........................... 382/197 |
| 7,430,336 | B2 * | 9/2008 | Raveendran .................. 382/268 |
| 7,590,589 | B2 * | 9/2009 | Hoffberg ........................ 705/37 |
| 7,751,482 | B1 * | 7/2010 | Srinivasan et al. ........ 375/240.16 |
| 7,813,537 | B2 * | 10/2010 | Epstein et al. ................ 382/128 |
| 7,855,731 | B2 * | 12/2010 | Yu .............................. 348/208.6 |

FOREIGN PATENT DOCUMENTS

| JP | 63-249193 A | 10/1988 |
| JP | 63-301382 A | 12/1988 |
| JP | 4-112385 A | 4/1992 |
| JP | 5-35871 | 2/1993 |
| JP | 2845107 | 10/1998 |
| JP | 3026592 | 1/2000 |
| JP | 3049672 | 3/2000 |

OTHER PUBLICATIONS

Japanese Office Action dated Jan. 20, 2012, in counterpart Japanese Application No. 2008-033625.
English-language translation of Japanese Office Action dated Jan. 20, 2012, in counterpart Japanese Application No. 2008-033625.

* cited by examiner

*Primary Examiner* — Yosef Kassa

(74) *Attorney, Agent, or Firm* — Fitzpatrick, Cella, Harper & Scinto

(57) ABSTRACT

An image processing apparatus specifies an evaluation-target area that tends to produce distortion in an object contained in an image, and calculates amount of distortion produced in vectorization of the object by comparing the shape of the object and the shape of a vectorized object obtained by vectorizing the object in the specified evaluation-target area. The apparatus further revises the shape of the vectorized object in the evaluation-target area so as to approach the shape of the object when the amount of distortion is larger than a predetermined reference value.

9 Claims, 16 Drawing Sheets

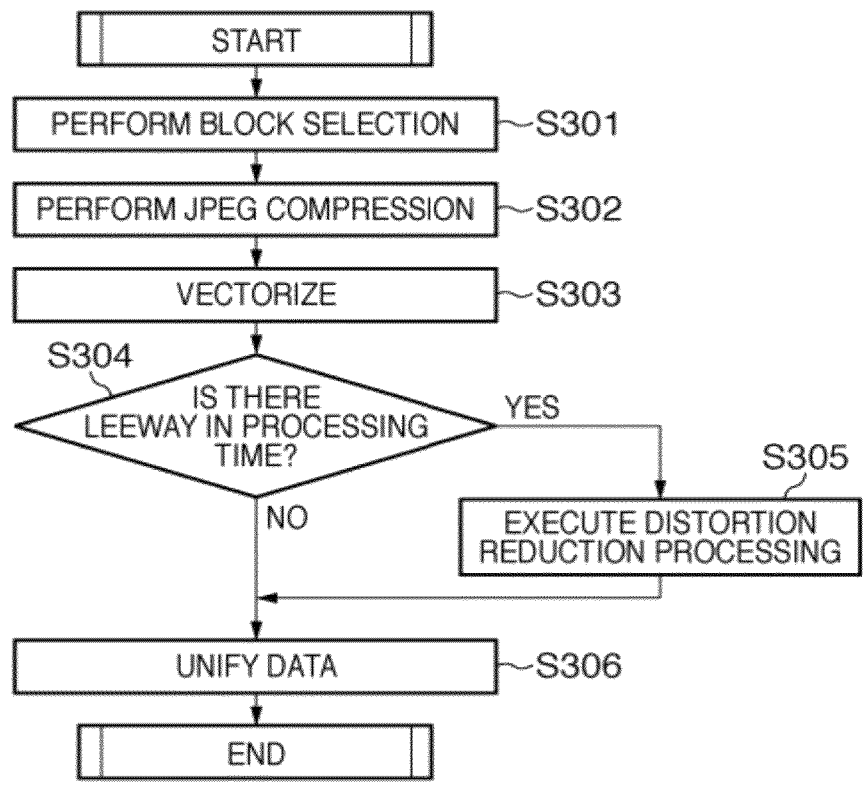
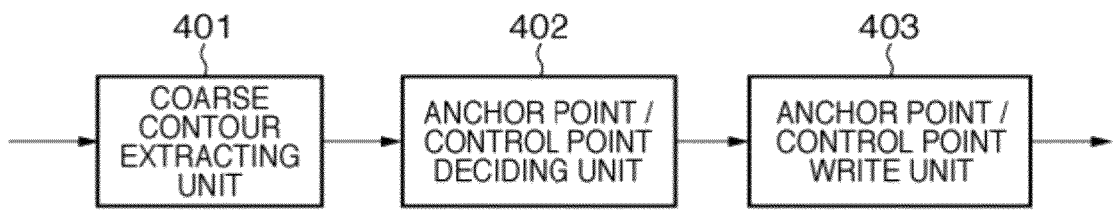

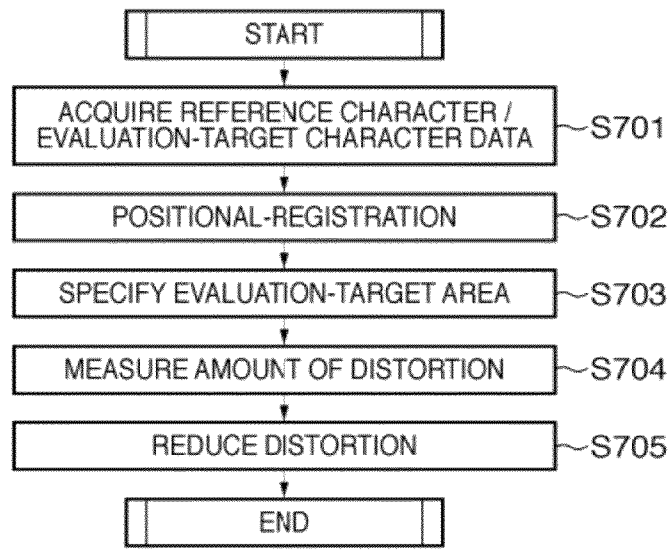
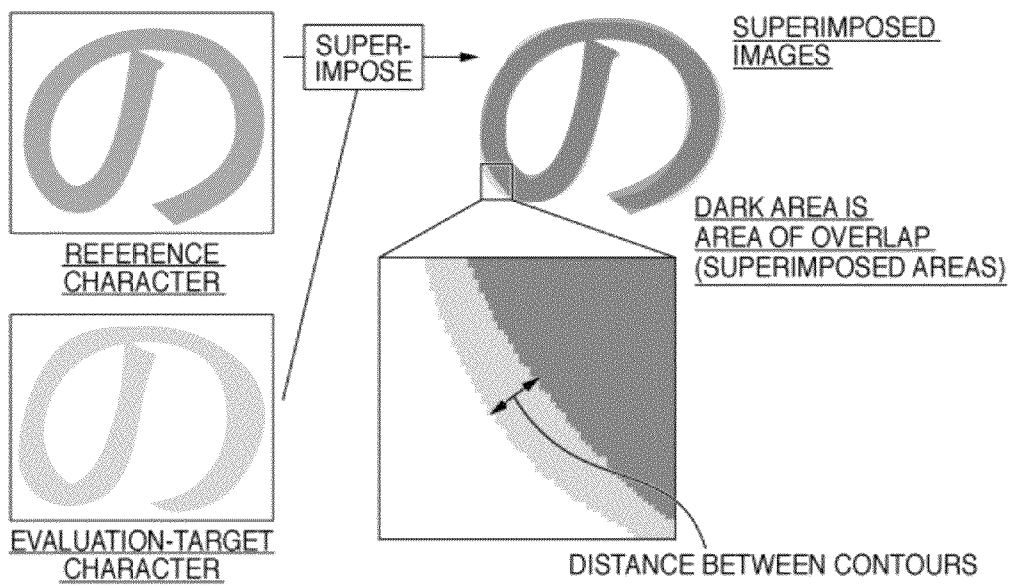

FIG. 9
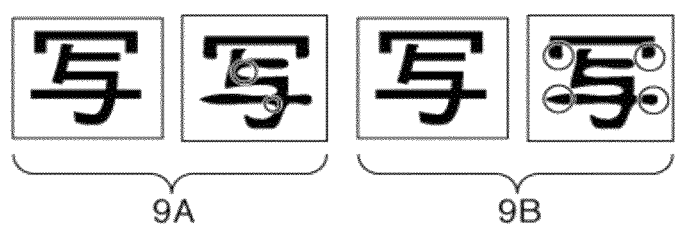
9A  9B
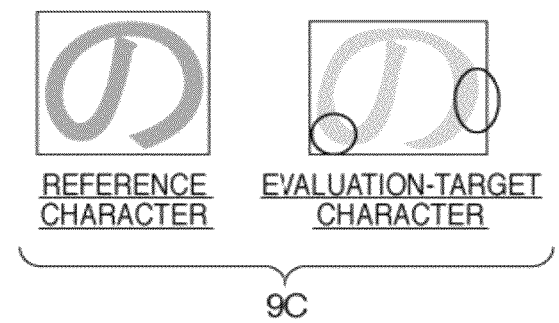
REFERENCE CHARACTER   EVALUATION-TARGET CHARACTER
9C
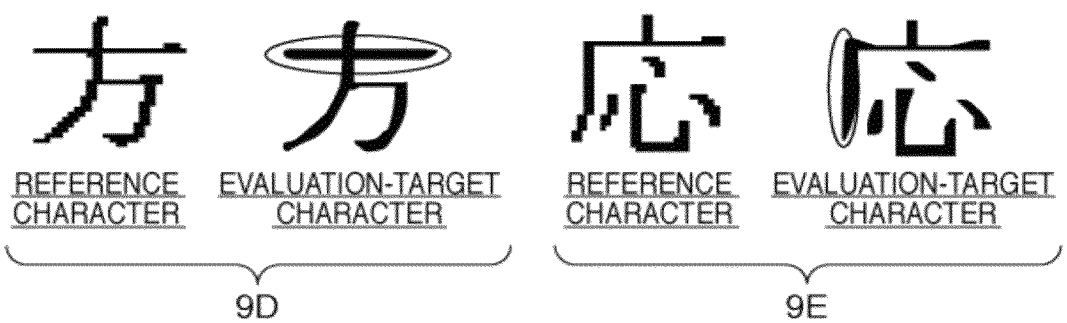
REFERENCE CHARACTER   EVALUATION-TARGET CHARACTER   REFERENCE CHARACTER   EVALUATION-TARGET CHARACTER
9D  9E $P_0$ : BEND POINT F I G. 13
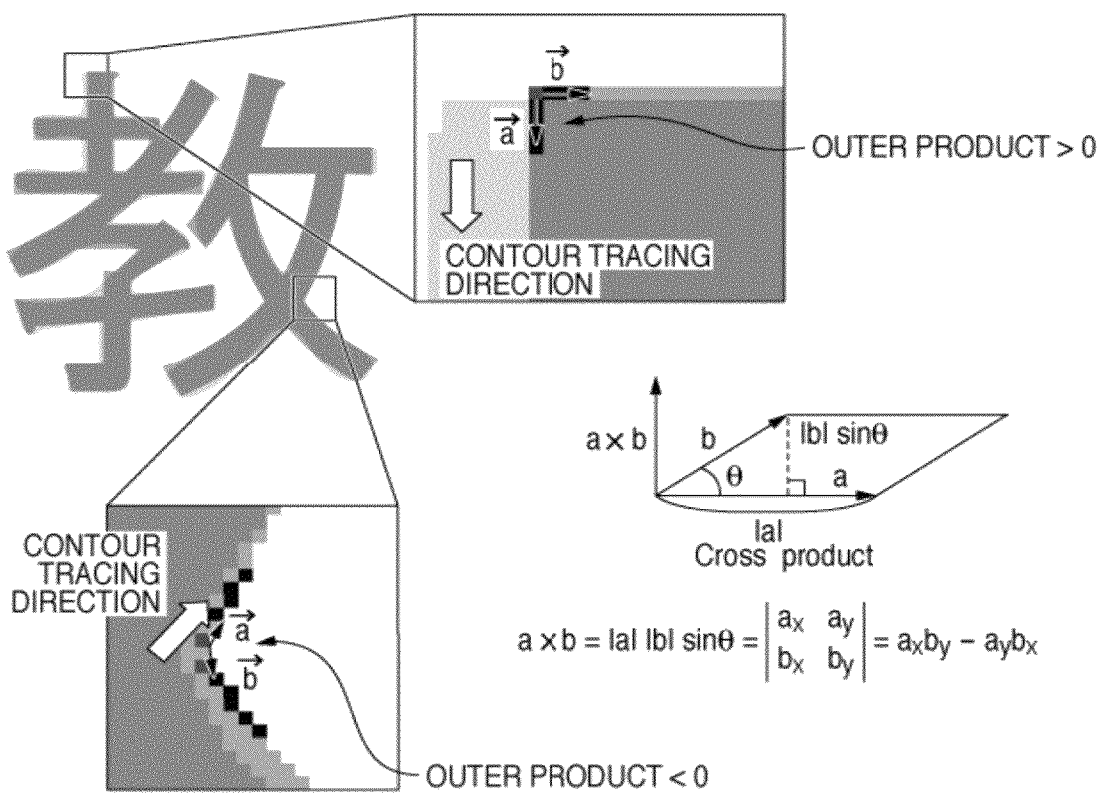

FIG. 19
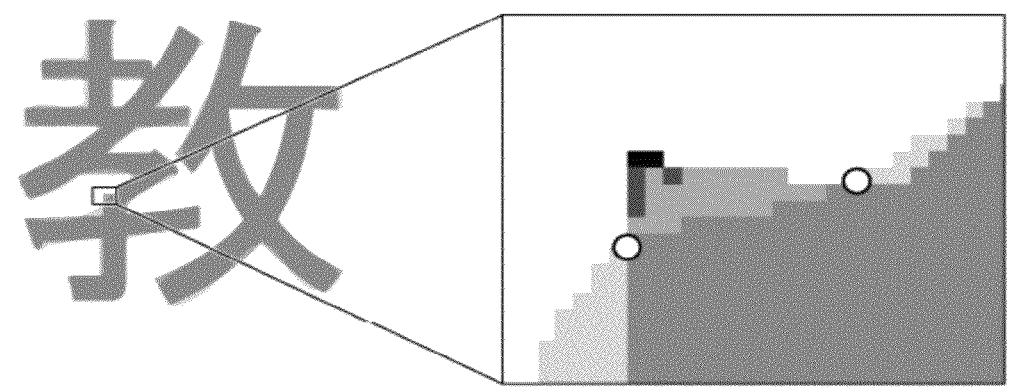
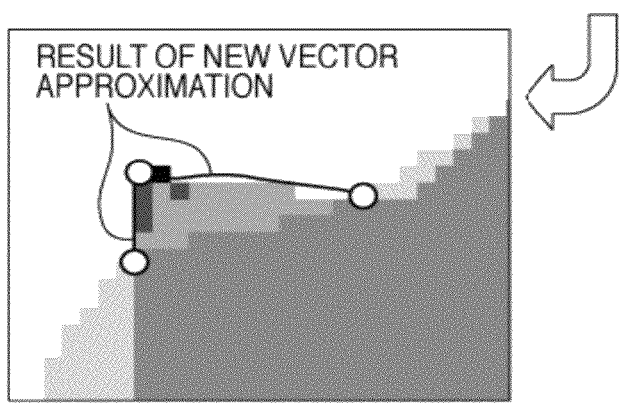
RESULT OF NEW VECTOR APPROXIMATION
○ : ANCHOR POINT

F I G. 20
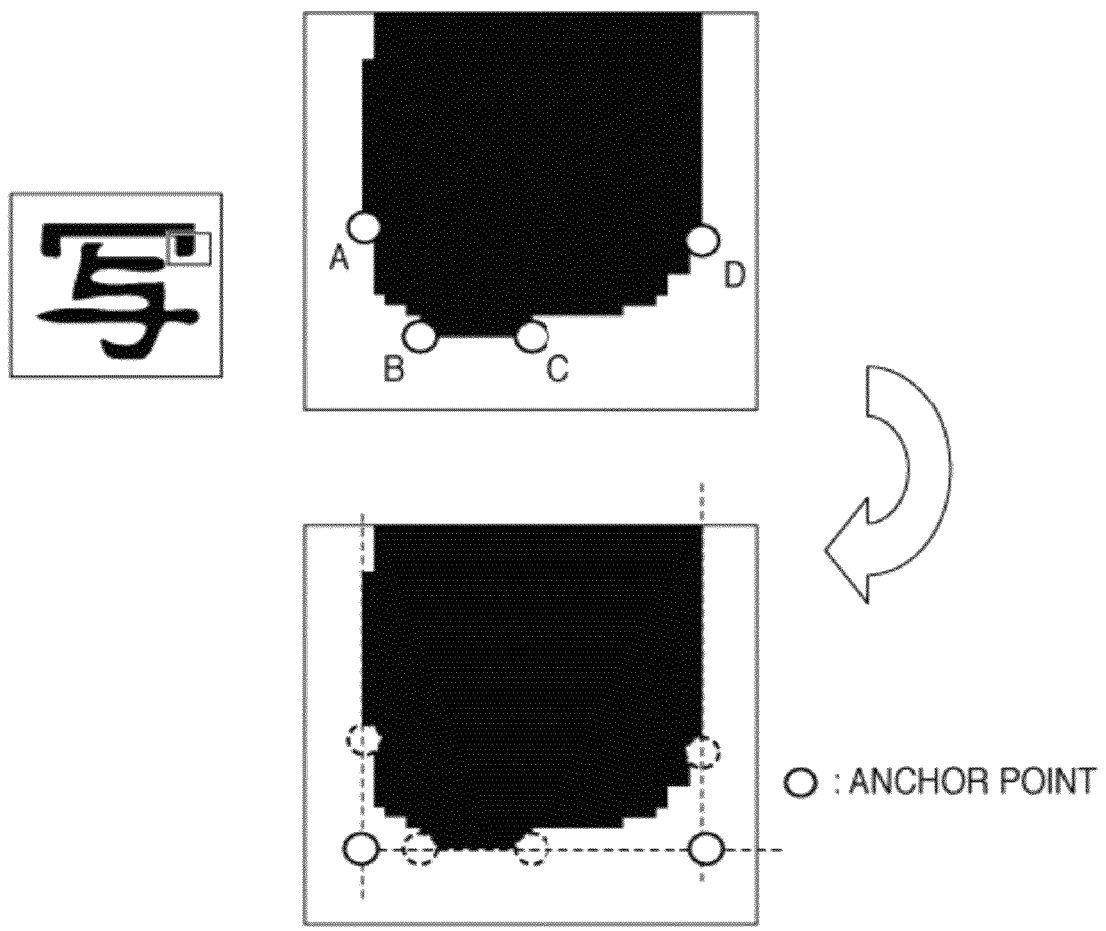

○ : ANCHOR POINT

IMAGE PROCESSING APPARATUS, METHOD AND RECORDING MEDIUM

BACKGROUND OF THE INVENTION

1. Field of the Invention

The present invention relates to an image processing apparatus for reducing distortion in vectorization of an object in a document that has been input by a scanner or the like, method, a recording medium storing the program thereof.

2. Description of the Related Art

With regard to the vectorization of images, a vectorization technique directed toward the fonts (typefaces) used in word processors and the like is well known in the art. A vectorization technique for fonts deals with input solely of characters designed beforehand to have an attractive appearance. When vectorization is carried out, a single character created in an analog fashion is digitized as a binary image having a comparatively large size of 512×512 pixels or 1024×1024 pixels, and the contour of the character is vectorized.

Since vectorized data basically makes it possible to express a smooth contour even when the character is enlarged to various desired sizes, the quality of character shapes represented by this data generally is considered good. Furthermore, since characters of various sizes can be generated based upon a single item of data, additional advantages are simplicity and the ability to reduce the amount of data. Accordingly, the specification of Japanese Patent No. 3049672 proposes a technique for implementing vectorization processing for the purpose of obtaining effects that exploit these features not only with regard to fonts but also with regard to binary images in general. Further, since vectorized data fundamentally is numerical data based upon coordinate values, editing processing by computer is easy to perform. Accordingly, the specification of Japanese Patent No. 2845107 discloses a proposal relating to vectorization of a read image that includes full-color portions.

The specification of Japanese Patent No. 3026592 discloses a proposal relating to vectorization of a binary image that is the premise of Japanese Patent No. 3049672. Japanese Patent No. 3026592 discloses an arrangement for retaining a pixel of interest from image data and the states of neighboring pixels, extracting the pixel of interest in the order of raster scanning and detecting vectors between pixels in the horizontal and vertical directions based upon the pixel of interest and states of the neighboring pixels. Also proposed is a method of discriminating the state of connection of the vectors between pixels and extracting the contour of image data based upon the discriminated connection state of the vectors between pixels. According to this method, all contour lines in an image can be extracted by just a single raster scan sequence and an image memory for storing all image data is not required. This makes it possible to reduce memory capacity. Further, by extracting contours in units of pixel edges and not based upon the center positions of pixels in an input image, a contour line having a useful width can be extracted even with regard to a fine line having a width of one pixel.

Further, when a vectorization technique is applied to a character, there are many cases where the approximation accuracy of vectorization is poor, the contours do not coincide between a character to be vectorized and a character that has been vectorized and, as a result, typical distortion occurs in vectorization. In order to deal with this problem, the specification of Japanese Patent Laid-Open No. 05-35871 discloses a method of finding a distance function between a given contour point and a contour vector while the positions of a prescribed number of end points of contour vectors are adjusted at one time, and obtaining a contour vector for which the norm is smallest. However, there is no particular description regarding a reduction in processing time and therefore this method is difficult to apply to the packaging of a product.

SUMMARY OF THE INVENTION

The present invention provides an image processing apparatus capable of holding down an increase in processing time in processing for reducing distortion produced in a vectorized object.

The present invention in its first aspect provides an image processing apparatus for vectorizing an object contained in an image, comprising: a calculation unit configured to specify an evaluation-target area that tends to produce distortion in the object, and calculate the amount of distortion produced in vectorization of the object by comparing the shape of the object and the shape of a vectorized object obtained by vectorizing the object in the specified evaluation-target area; and a revising unit configured to revise the shape of the vectorized object in the evaluation-target area so as to approach the shape of the object when the amount of distortion is larger than a predetermined reference value.

The present invention in its second aspect provides an image processing method executed in an image processing apparatus for vectorizing an object contained in an image, comprising: a calculation step of specifying an evaluation-target area that tends to produce distortion in the object, and calculating the amount of distortion produced in vectorization of the object by comparing the shape of the object and the shape of a vectorized object obtained by vectorizing the object in the specified evaluation-target area; and a revising step of revising the shape of the vectorized object in the evaluation-target area so as to approach the shape of the object when the amount of distortion is larger than a predetermined reference value.

The present invention in its third aspect provides a computer-readable recording medium on which has been recorded an image processing program for vectorizing an object contained in an image. The program causes a computer to specify an evaluation-target area that tends to produce distortion in the object, and calculate the amount of distortion produced in vectorization of the object by comparing the shape of the object and the shape of a vectorized object obtained by vectorizing the object in the specified evaluation-target area. The program also causes the computer to revise the shape of the vectorized object in the evaluation-target area so as to approach the shape of the object when the amount of distortion is larger than a predetermined reference value.

In accordance with the present invention, an increase in processing time can be suppressed in performing a processing operation for reducing distortion produced in a vectorized object.

Further features of the present invention will become apparent from the following description of exemplary embodiments with reference to the attached drawings.

BRIEF DESCRIPTION OF THE DRAWINGS

FIG. 3 is a flowchart illustrating processing executed by the scan data file conversion unit;

FIG. 4 is a block diagram illustrating the functional configuration of a vectorization unit;

FIG. 7 is a flowchart illustrating processing executed by the distortion reducing unit;

FIG. 8 is a diagram useful in describing positional registration performed in the distortion reducing unit;

FIGS. 9A to 9E are diagrams useful in describing an area specified on a character;

FIG. 13 is a diagram useful in describing a method of classifying bend points, recess points and protrusion points;

FIG. 19 is a diagram useful in describing a method of reducing distortion in a protruding area;

FIG. 20 is a diagram useful in describing another method of reducing distortion in a protruding area;

DESCRIPTION OF THE EMBODIMENTS

Figure 1:
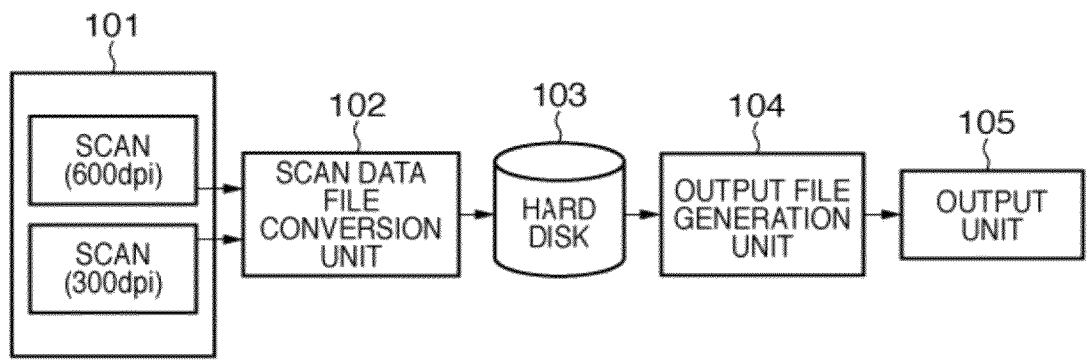
FIG. 1 is a diagram illustrating the block configuration of an image processing apparatus in an embodiment of the present invention.

A preferred embodiment of the present invention will now be described in detail with reference to the drawings. It should be noted that identical structural elements are designated by like reference characters.

Figure 2:
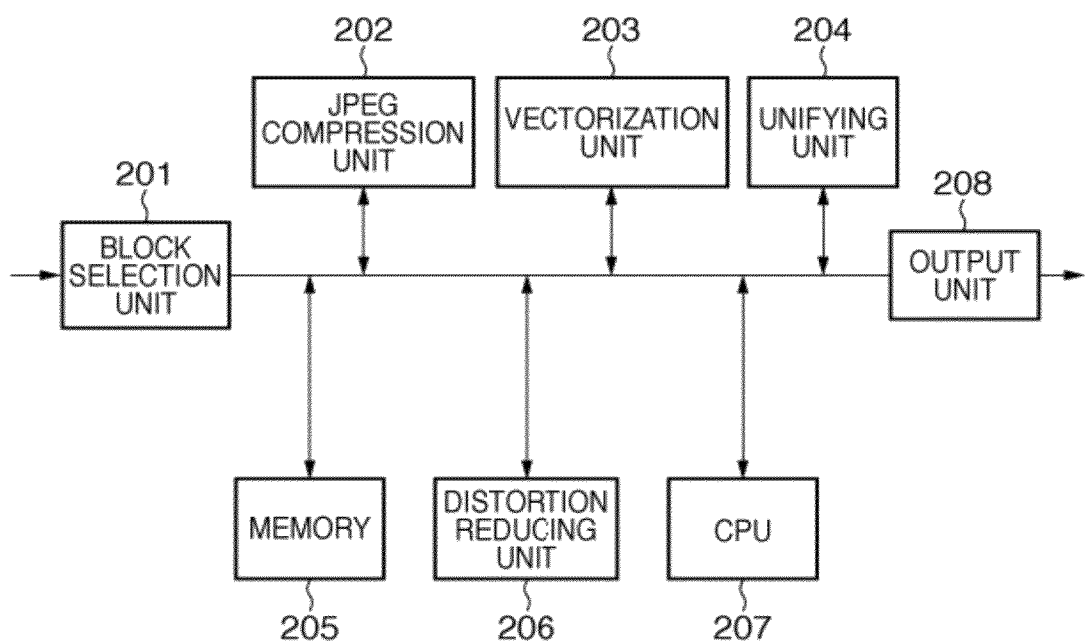
FIG. 2 is a block diagram illustrating the functional configuration of a scan data file conversion unit.

FIG. 1 is a diagram illustrating the block configuration of an image processing apparatus in an embodiment of the present invention. As shown in FIG. 1, the image processing apparatus includes a scanning unit 101, a scan data file conversion unit 102, a hard disk 103, an output file generation unit 104 and an output unit 105. In this embodiment, an MFP (multifunction peripheral) equipped with multiple functions may be used as the image processing apparatus. FIG. 2 is a block diagram illustrating the functional configuration of the scan data file conversion unit 102. As shown in FIG. 2, the scan data file conversion unit 102 includes a block selection unit 201, a JPEG compression unit 202, a vectorization unit 203, a unifying unit 204, a memory 205, a distortion reducing unit 206, a CPU 207 and an output unit 208.

This image processing apparatus is equipped with a copy function and a send function for converting scan data to a file and storing the file on an internal hard disk or transmitting it to a personal computer. The apparatus scans at 600 dpi when copying. When the send function is used, however, scanning is performed at either 600 dpi or 300 dpi, which is selected by the user. Since this embodiment relates to the send function, the description below will be limited to the send function. Further, since the processing applied is the same regardless of whether the scan data is 600 dpi or 300 dpi, a case where scanning is performed at 300 dpi will be described below.

First, when a 300-dpi scan command is received from the user, the image processing apparatus transmits scan data to the scan data file conversion unit 102. The scan data file conversion unit 102 subjects the scan data to various image processing operations such as vectorization, collects the data in a file format operations such as PDF and outputs the result to the hard disk 103. Although the hard disk 103 is located internally of the image processing apparatus in this embodiment, it may be in a personal computer connected on a network or some other storage medium.

FIG. 3 is a flowchart illustrating processing executed by the scan data file conversion unit 102. The processing executed by the scan data file conversion unit 102 will be described with reference to FIGS. 2 and 3. First, in step S301, the block selection unit 201 divides an externally input document image (input image) into areas of four types, namely a text area, a background area, a photograph area and a line drawing area. Text, background, photographs and line drawings into which the image is divided are referred to as "objects". The objects thus obtained may be stored in the memory 205. Next, in step S302, the text area is transmitted to the vectorization unit 203 and the input image is transmitted to the JPEG compression unit 202. The JPEG compression unit 202 performs JPEG compression upon filling in the text area of the input image with a prescribed color (e.g., an average color obtained from the colors of peripheral elements in each text area), and transmits a compressed code string to the memory 205 as JPEG data. In this embodiment, the entire input image in which text areas have been filled in is subjected to JPEG compression. However, it may be so arranged that JPEG compression and storage are performed per area other than a text area (namely an area that is the target of vectorization). Further, although this embodiment is described taking vectorization of a text area as an example, it may be so arranged that a line drawing or rules line, etc., is vectorized. In step S303, the vectorization unit 203 extracts the contour of a character from the text area, applies vectorization and outputs the vectorized character to the memory 205 as vectorized data. A method of vectorization by the vectorization unit 203 will be described later. In step S304, when processing of the entire entered image ends, the CPU 207 determines whether there is any leeway in the remaining processing time. If it is determinded that there is leeway, control proceeds to step S305. Here the CPU 207 instructs the distortion reducing unit 206 to execute processing, in response to which the distortion reducing unit 206 executes processing for reducing distortion. Operation of the distortion reducing unit 206 will be described later. When processing by the distortion reducing unit 206 ends, control proceeds to step S306. Here the distortion reducing unit 206 outputs the data to the memory and the CPU 207, upon confirming the data output, instructs the unifying unit 204 to execute unification processing. Upon being so instructed by the CPU, the unifying unit 204 unifies the JPEG data and the vectorized data into a file format such as PDF and then outputs the file. On the other hand, if it is determined in step S304 that there is no leeway, control proceeds to step S306, without execution of distortion reduction processing, and unification processing for unifying the JPEG data and the vectorized data is executed. In this case, image quality declines in comparison with the case where distortion reduction processing is executed. Further, the determination in step S304 may be made by comparing the remaining processing time with a predetermined reference time.

FIG. 4 is a block diagram illustrating the functional configuration of the vectorization unit 203. As shown in FIG. 4, the vectorization unit 203 includes a coarse contour extracting unit 401, an anchor point/control point deciding unit 402 and an anchor point/control point write unit 403. The anchor point and the control point will be referred to as "AP" and "CP", respectively, below. The coarse contour extracting unit 401 binarizes the entered text area, extracts a coarse contour and outputs the coarse contour to the memory 205. The coarse contour is a set of straight lines connecting points where the tracing direction changes when the contour of the character is traced, as illustrated in an enlarged view (6B) of a rectangular portion (6A) in FIG. 6. Only point information is output from the vectorization unit 203 to the memory 205 as the coarse contour data. The anchor point/control point deciding unit 402 decides AP and CP based upon the coarse contour data. Furthermore, the anchor point/control point write unit 403 outputs the decided AP and CP to the memory 205. Processing by the distortion reducing unit 206 will be described next.

Figure 5:
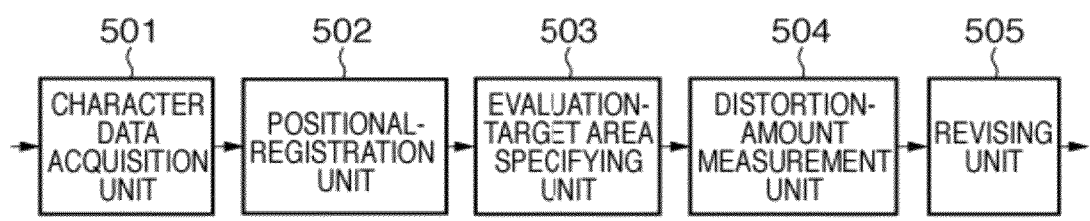
FIG. 5 is a block diagram illustrating the functional configuration of a distortion reducing unit.

FIG. 5 is a block diagram illustrating the functional configuration of the distortion reducing unit 206. As shown in FIG. 5, the distortion reducing unit 206 includes a character data acquisition unit 501, a registration unit 502, an evaluation-target area specifying unit 503, a distortion-amount measurement unit 504 and a revising unit 505. Processing executed by the distortion reducing unit 206 will be described with reference to FIGS. 5 and 7.

FIG. 7 is a flowchart illustrating the processing executed by the distortion reducing unit 206. First, in step S701, when the distortion reducing unit 206 receives an instruction to execute processing from the CPU 207, the character data acquisition unit 501 acquires raster data of a reference character and vector data of a character to be evaluated from the memory 205. The reference character refers to a character image that is the target of vectorization and it indicates a character that is output before step S303 of FIG. 3, for example, as the result of step S301. Further, the character to be evaluated refers to a character (also referred to as a "vectorized object") that is obtained by vectorization and it indicates a character that is output as a result of step S303 in FIG. 3. Next, by superimposing the reference character and the evaluation-target character (a character to be evaluated) in step S702, as illustrated in FIG. 8, upon measuring distortion, the characters are brought into positional registration with attention being directed toward the amount of offset between the contours. The method of registration is generally well known. For example, first the vector data of the evaluation-target character is rasterized and a raster image is generated. Then, two processing operations, namely calculating the sum of the differences of pixel values between two images and moving one image relative to the other by one pixel, are executed repeatedly, and a positional relationship for which the sum of the differences is minimized is found, whereby the two images are brought into register. An evaluation-target area (described later) is specified in step S703, the amount of distortion in the evaluation-target area is measured in step S704, and distortion reduction processing for reducing and revising distortion is executed in step S705. The processing of steps S703 to S705 will be described further below.

Step S703 calls for the specifying of an area that exhibits a large effect visually and that is especially susceptible to the occurrence of distortion when vectorization is applied. In this embodiment, such an area susceptible to the occurrence of distortion is adopted as the evaluation-target area. FIGS. 9A to 9E are diagrams useful in describing evaluation-target areas. The encircled portions in FIGS. 9A to 9E are evaluation-target areas. Five areas are specified in this embodiment, namely a recessed area (9A), a protruding area ((9B), a curved area (9C), a linear surface area (9D) and a linear approximation area (9E). In particular, the recessed area, the protruding area, the curved area and the linear surface area are specified in terms of reference characters. The recessed area and the protruding area are specified as evaluation-target areas since the recessed area and the protruding area in the reference character exhibit a large effect visually when they are distorted, as shown by the encircled portions in FIGS. 9A to 9B. Further, the curved area and the linear surface area are specified as evaluation-target areas since the thicknesses of the curved area and the linear surface area in the reference character exhibit a large effect visually when they change, as shown by the encircled portions in FIGS. 9C to 9D. Since the linear surface area has a linear shape, it is also referred to as a "first linearly shaped area" below. Further, the linear approximation area is specified as an evaluation-target area in terms of the evaluation-target character since a curved area that is comparatively long and has a large curvature exhibits a large effect visually when it is linearly approximated in FIG. 9E. Since the linear approximation area has a linear shape, it is referred to as a "second linearly shaped area" below. Next, a method of specifying these areas in step S703 in FIG. 7 will be described. The five types of evaluation-target areas mentioned above may be superimposed within one character. For example, there are also cases where the end portion of a linear surface area that is long in the transverse direction is a protruding area.

Figure 10:
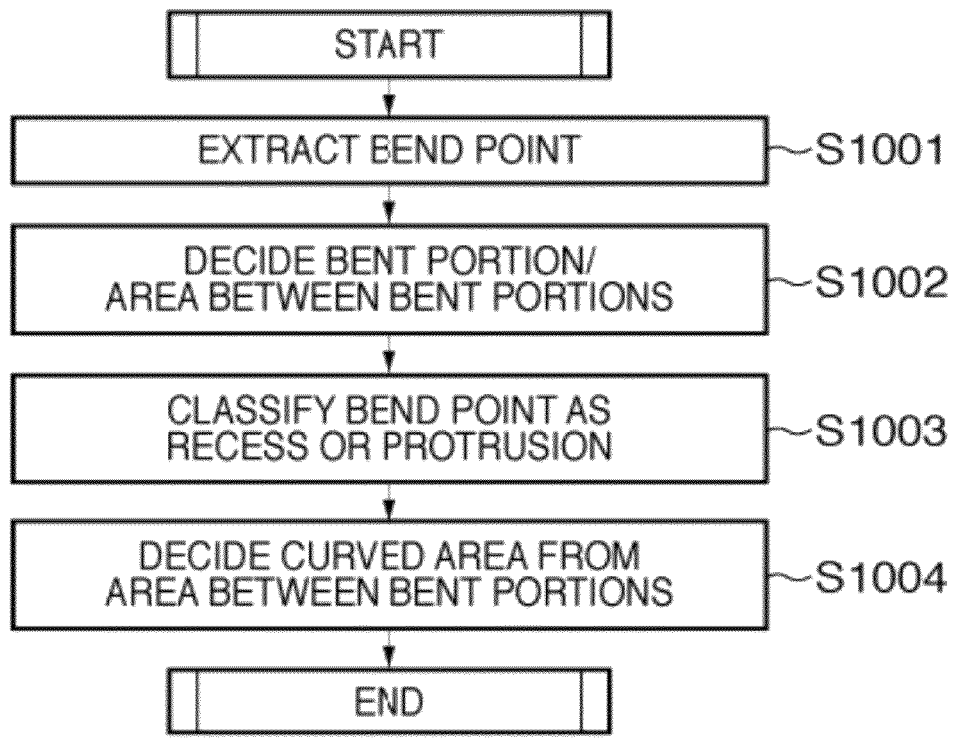
FIG. 10 is a flowchart illustrating processing for specifying a recessed area, a protruding area and a curved area.
Figure 11:
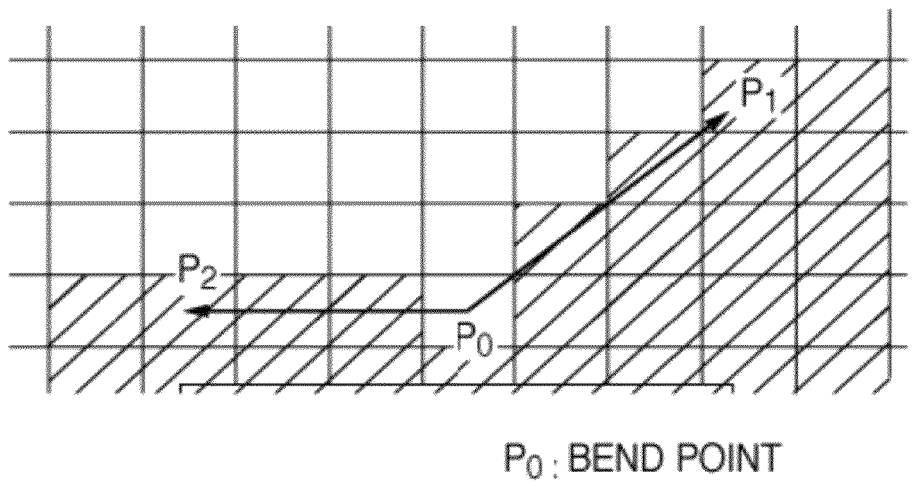
FIG. 11 is a diagram useful in describing a bend point.

FIG. 10 is a flowchart illustrating processing for specifying a recessed area, protruding area and curved area. First, in step S1001, a bend point is extracted from a row of pixels obtained by tracing the row of pixels on the contour of a reference character. FIG. 11 is a diagram useful in describing a bend point. A bend point refers to a location where a contour bends to such an extent that the angle of the pixel row exceeds a predetermined angle. Bend points are classified as either recess points or protrusion points at subsequent steps. A method of extracting a bend point is generally well known. For example, as shown in FIG. 11, take note of pixel P0 traversed in the tracing of pixels on the contour of the reference character. With regard to the pixel P0, points P1 and P2 located a distance of K pixels ahead and behind P0 are set and the cosine C of the angle defined by line segments P0-P1 and P0-P2 is calculated. If the cosine C is greater than a prescribed value (e.g., −0.65), the pixel P0 is extracted as a bend point.

Figure 12:
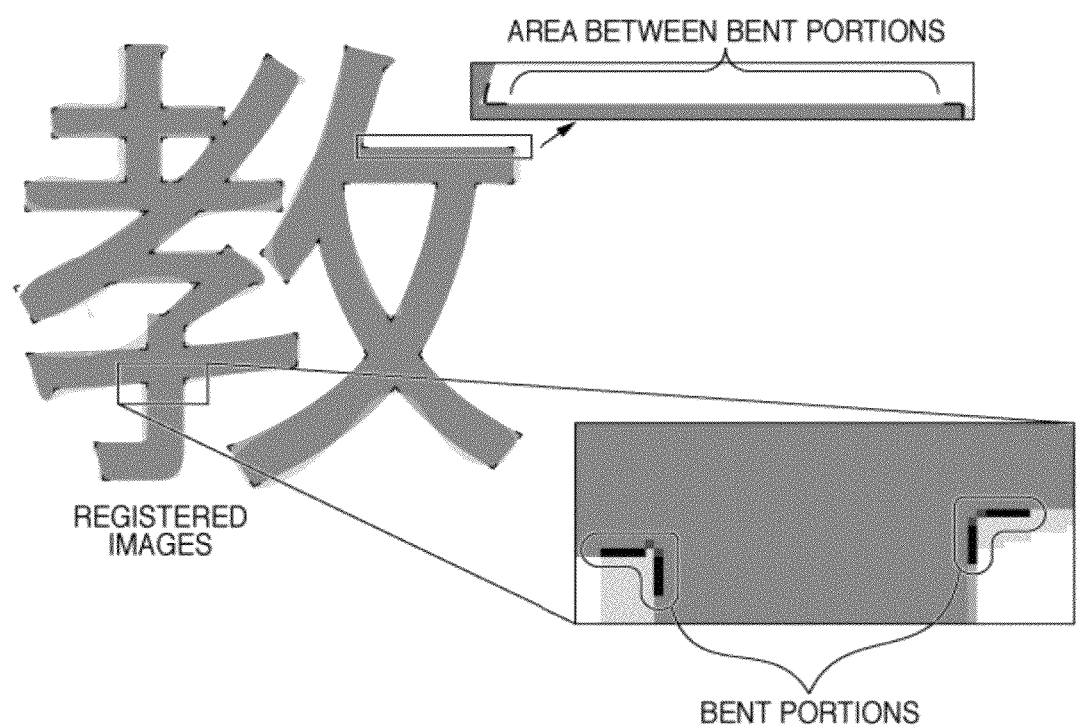
FIG. 12 is a diagram useful in describing bent portions and an area between bent portions.
Figure 14:
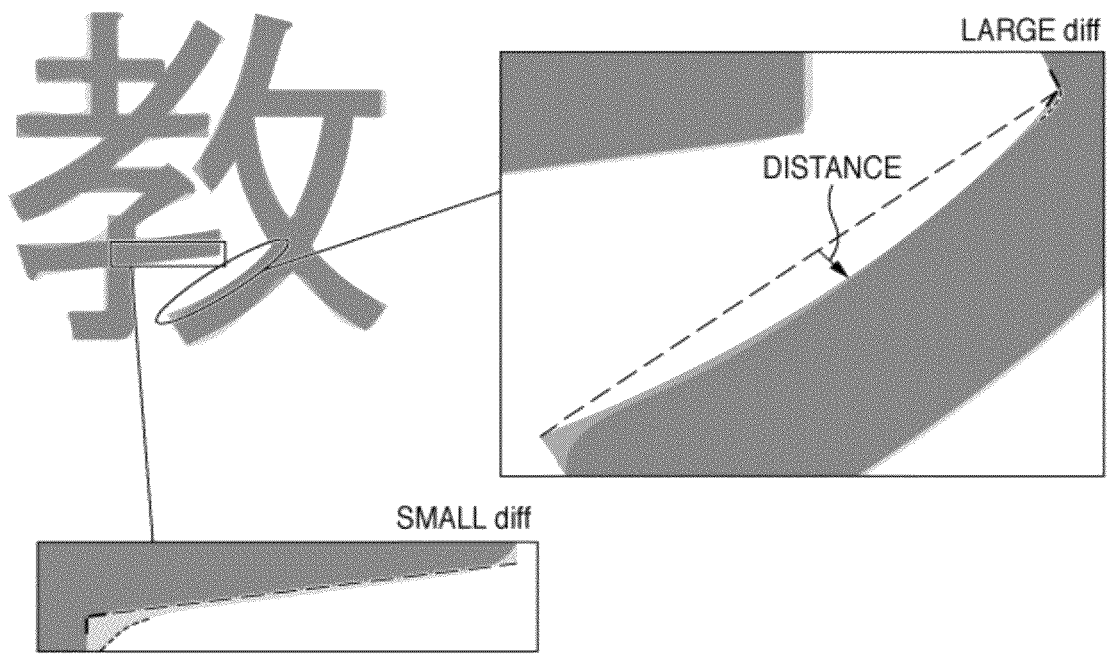
FIG. 14 is a diagram useful in describing a method of specifying a curved area.

Next, in step S1002, bent portions and an area between bent portions are determined. FIG. 12 is a diagram useful in describing bent portions and an area between bent portions. As illustrated in FIG. 12, a bent portion refers to a portion obtained by combining a bend point and pixels in the vicinity of the bend point on the contour of the reference character. Here "pixels in the vicinity" refers to a pixel row that exists within a certain distance from the bend point, namely a distance that is within one-tenth the length of whichever of the vertical and horizontal lengths of the circumscribed rectangle of the reference character is smaller. In this embodiment, a bent portion whose bend point has been classified as a protrusion point is referred to as a "protruding area", and a bent portion whose bend point has been classified as a recess point is referred to as a "recessed area". Further, as illustrated in FIG. 12, an area bracketed by two mutually adjacent bent portions on the contour of the reference character is referred to as an "area between bent portions". Whether an area between bent portions is a curved area is determined at subsequent steps.

Bend points are classified into recess points and protrusion points in step S1003. As for the method of classification, assume a direction that is the reverse of the contour tracing direction as seen from the bend point, as illustrated in FIG. 13.

Figure 15:
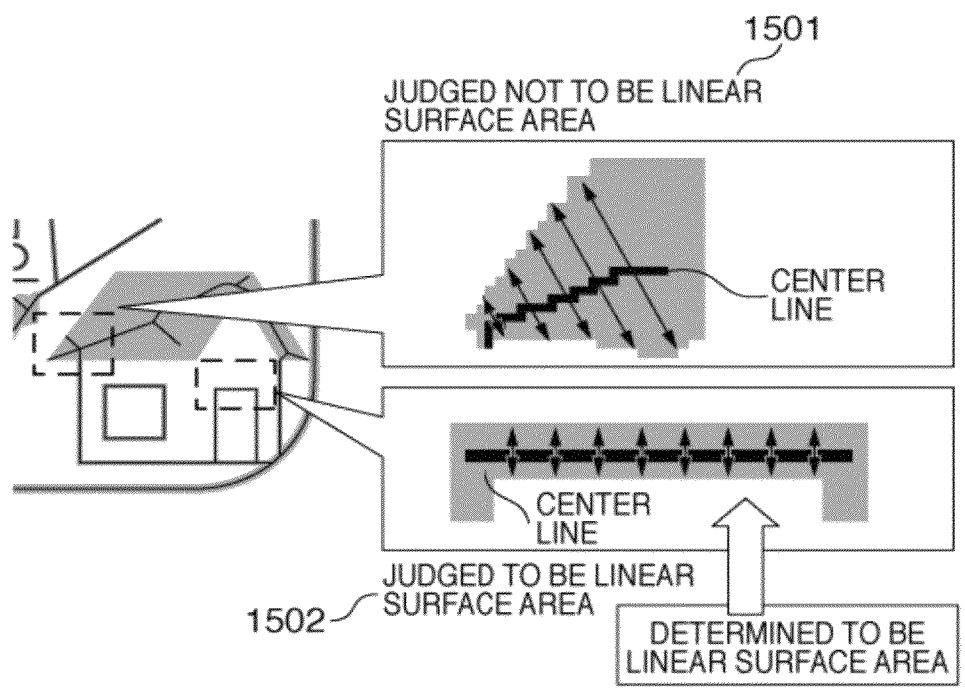
FIG. 15 is a diagram useful in describing a method of specifying a linear surface area.

Classification is performed by determining that the bend point is a protrusion point if the outer product is positive and a recess point if the outer product is negative. Next, in step S1004, a curved area is specified based upon the area between bent portions. As to whether an area is a curved area is determined by determining whether the area between bent portions is greater than a predetermined curvature. The curvature in this embodiment is found by Equation (1) below taking note of a difference diff between an average distance and a maximum distance among distances between a straight line connecting bend points and the contour of the reference character.

$$\text{diff}=\text{abs}(\text{maxdist}-\text{avedist}) \tag{1}$$

where "maxdist" and "avedist" represent the maximum distance and average distance, respectively, and "abs" represents a function for acquiring the absolute value. In this embodiment, an area between bent portions is specified as a curved area if the distance diff is greater than a predetermined reference value. FIG. 15 is a diagram useful in describing a method of specifying a linear surface area. Although a figure is used here instead of a character, the method may be applied to a character as well. In this embodiment, the reference character is subjected to center-line processing (e.g. thinning processing or skeltonization processing) and an area on the reference character where it has been determined that the distances from each of the center lines obtained by the center-line processing to the contour are substantially constant is specified as a linear surface area. Such specifying is carried out in similar fashion in the vertical and horizontal directions, or in the diagonal direction, of the reference character. Further, the thickness of the linear surface area, namely the above-mentioned distance, is stored in the memory 205 for the sake of subsequent distortion reduction processing. It should be noted that center-line processing is processing for finding a line that passes midway between a pair of contour lines and can employ a well-known technique.

Figure 6:
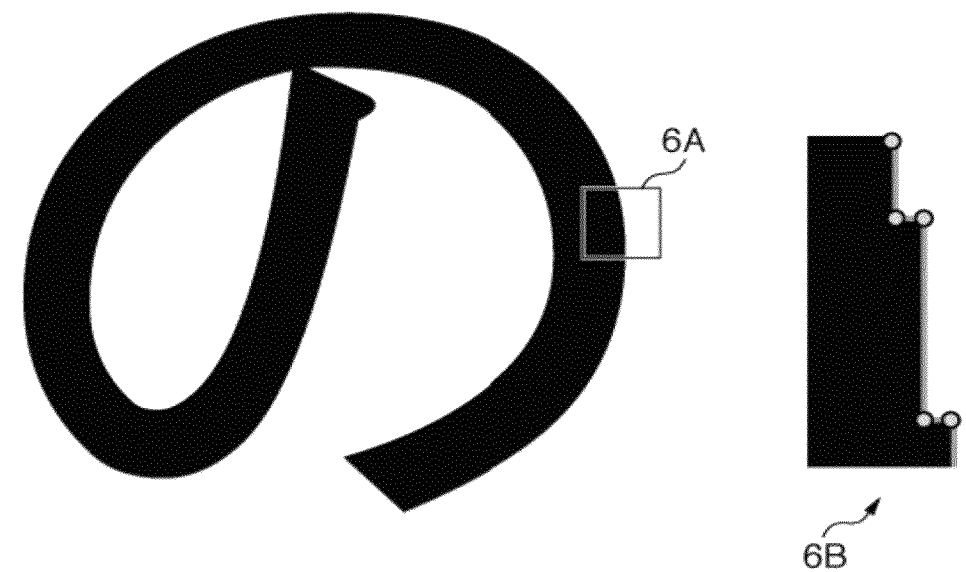
FIG. 6 is a diagram useful in describing a coarse contour extracted in the vectorization unit.

A linear approximation area is a linear portion of a coarse contour extracted by coarse contour extraction of the kind described in FIG. 6 with respect to an evaluation-target character. A portion having a length that is greater than half the length of whichever of the vertical and horizontal lengths of the circumscribed rectangle of the reference character is smaller is specified as a linear approximation area.

Figure 16:
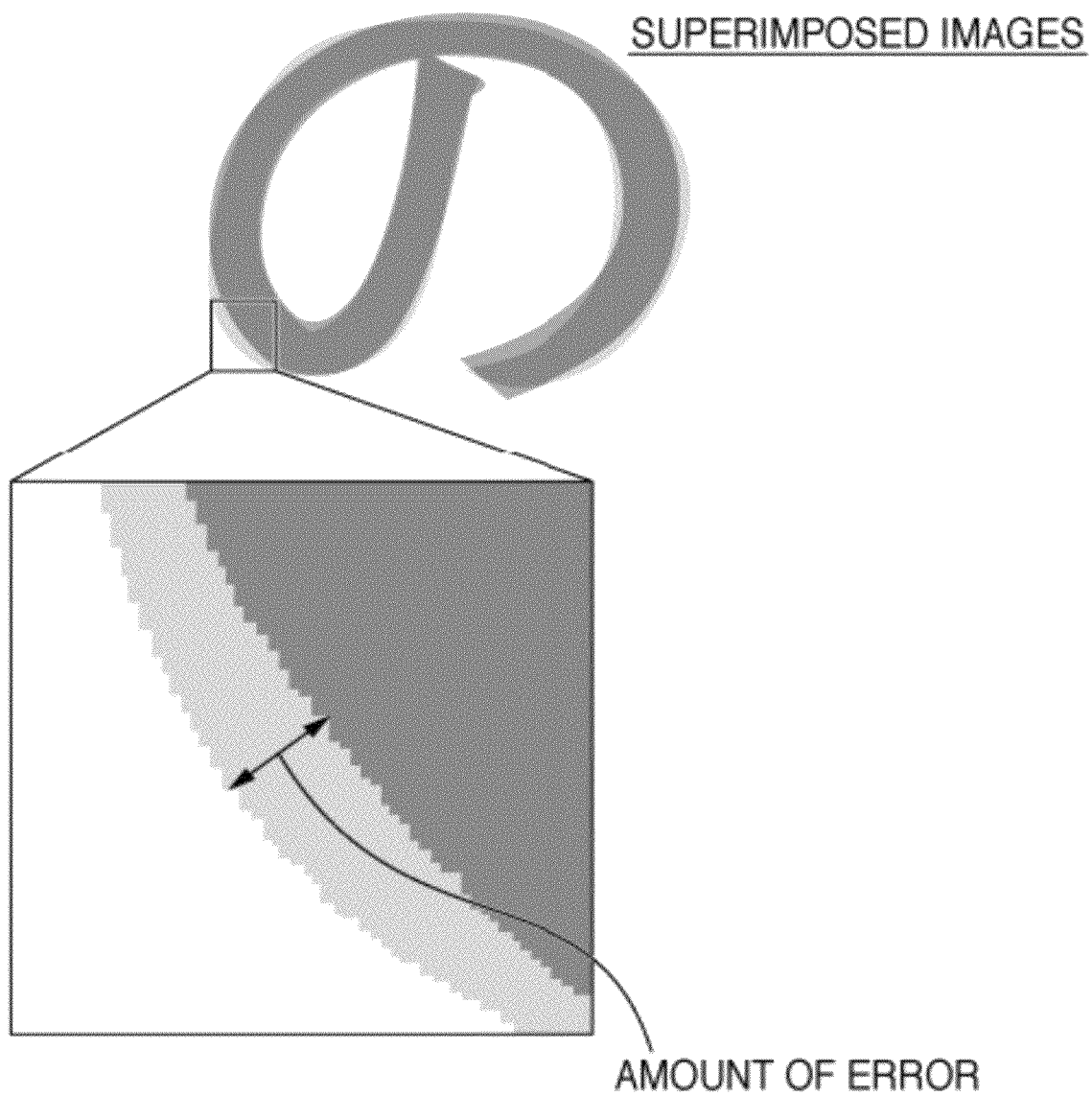
FIG. 16 is a diagram useful in describing a method of calculating amount of distortion.

In step S704, the amount of distortion is calculated with regard to each of the five types of areas specified as evaluation-target areas. With regard to the recessed area, the protruding area, the curved area and the linear surface area, first a straight line is drawn in the normal direction from one pixel (referred to a "point of interest" below) within a specific area on the reference character contour, as illustrated in FIG. 16. Next, a point (referred to as a "correspondence point") at which the straight line meets the contour of the evaluation-target character is found, the distance between the two points is measured and this distance is adopted as the difference amount at the point of interest. This calculation of the difference amount is performed for all pixels within the specific area of interest, the sum total is found and the average value of difference amount per pixel is calculated as the amount of distortion. Distortion reduction processing is executed at step S705 with regard to an area for which the amount of distortion is greater than a threshold value (also referred to as a "reference value" below).

Figure 17:
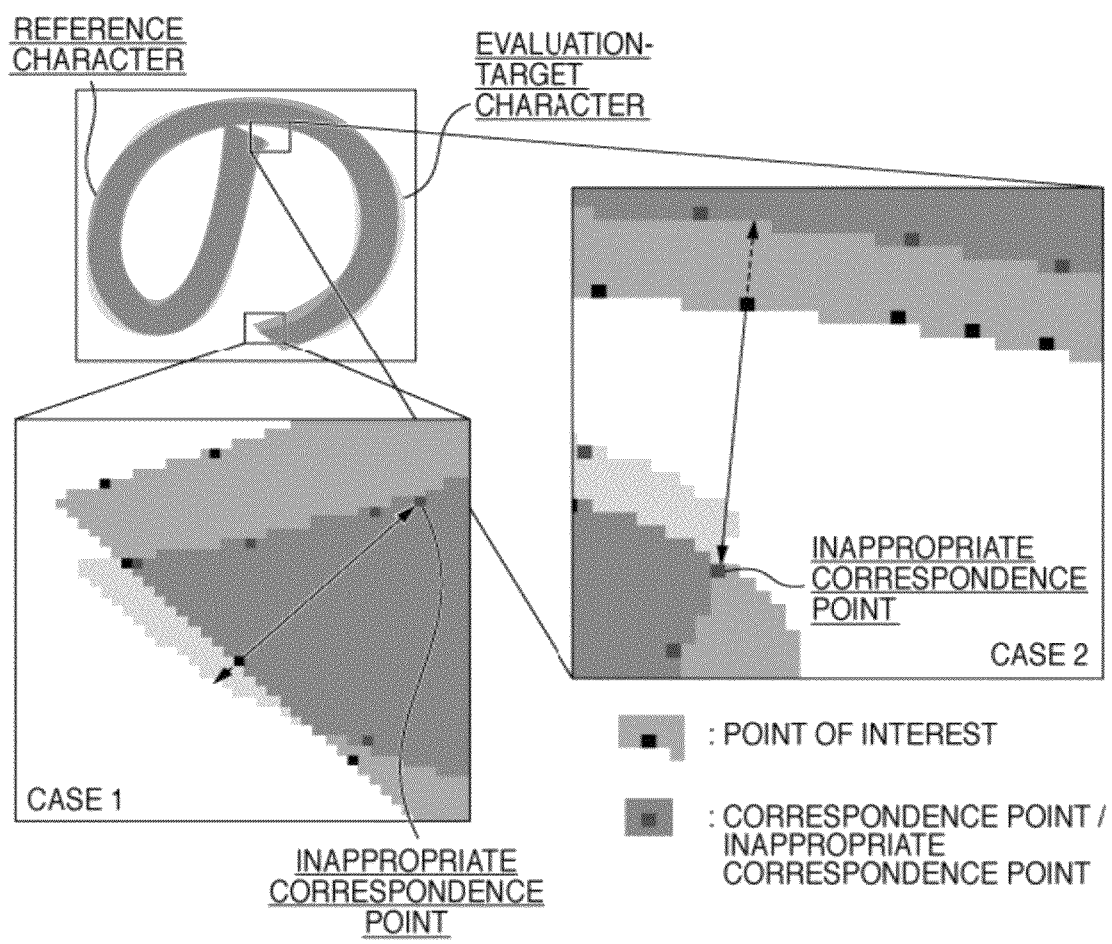
FIG. 17 is a diagram useful in describing a method of discriminating correspondence points.

Caution is required in terms of finding correspondence points. Specifically, in a case where there is a character contour in a direction opposite from that of a correspondence point that should rightfully be adopted, as illustrated in FIG. 17, another correspondence point exists and therefore which correspondence point is the correct one must be determined. Accordingly, in this embodiment, the straight line connecting the point of interest and the correspondence point is taken into consideration and whether the correspondence point is correct or not is determined. That is, in an instance where the position of the point of interest overlaps the evaluation-target character in the registration image, as in Case 1 in FIG. 17, a straight line connecting the point of interest and the correct correspondence point will pass through the area of the evaluation-target character and will not pass through another area in which there is an overlap between the evaluation-target character and the reference character. Accordingly, in an instance where there are two correspondence points in such case, the correspondence point for which the straight line passes through only the area of the evaluation-target character is selected as the correct correspondence point.

On the other hand, in an instance where the position of the point of interest does not overlap the evaluation-target character in the registration image, as in Case 2 in FIG. 17, a straight line connecting the point of interest and the correct correspondence point will pass through the interior of the reference character. In addition, the straight line will not pass through an area in which the two characters overlap or an area which is not the interior of either character (i.e., an area external to the two characters). Accordingly, in an instance where there are two correspondence points in such case, the correspondence point for which the straight line passes through only the area of the reference character is selected as the correct correspondence point. In this embodiment, in cases where the position of the point of interest does and does not overlap the evaluation-target character, the correct correspondence point can be determined in accordance with the foregoing rules if two correspondence points occur in each of these cases.

With regard to a linear approximation area, the difference diff is found between the contours of the evaluation-target character and the reference character and, if the difference diff is greater than a threshold value, the contour having the larger curvature is taken as being linearized and is subjected to distortion reduction processing. Further, in the case of a linear approximation area, the point of interest lies on the contour of the evaluation-target character, as described above. Accordingly, processing for detecting a correspondence point is processing that would be described upon reversing the evaluation-target character and the reference character in the foregoing description for determining the correct correspondence point.

Next, distortion is reduced in step S705. In this embodiment, distortion reduction processing optimum for each type of area is applied to an area in which the amount of distortion is greater than the threshold value.

Figure 18:
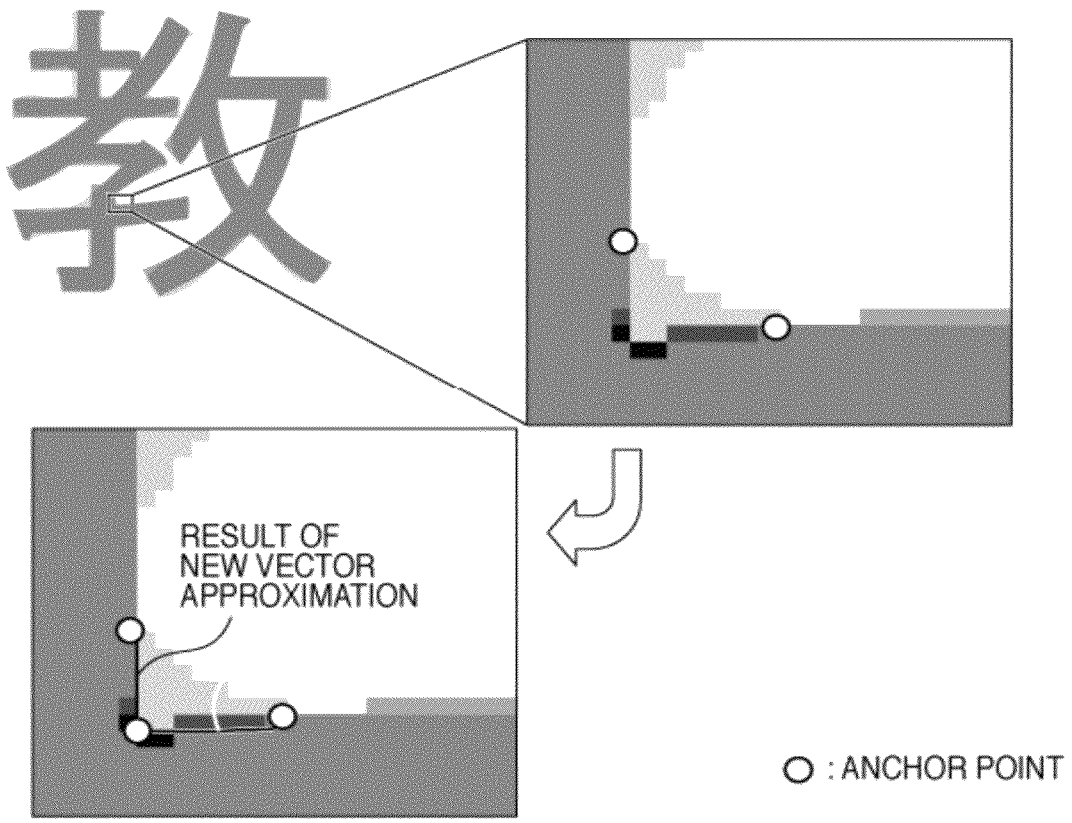
FIG. 18 is a diagram useful in describing a method of reducing distortion in a recessed area.

FIG. 18 is a diagram useful in describing a method of reducing distortion in a recessed area. In this embodiment, anchor points are set at recesses that have been detected, as shown in FIG. 18. As a result, distortion that has occurred in a recessed area can be reduced by a row of vectors between anchor points that include the recess point.

FIG. 19 is a diagram useful in describing a method of reducing distortion in a protruding area. In this embodiment, anchor points are set at protrusion points that have been detected, as shown in FIG. 19. As a result, distortion that has occurred in a protruding area can be reduced by a row of vectors between anchor points that include the protrusion point. FIG. 20 is a diagram useful in describing another method of reducing distortion in a protruding area. Two bend points that are adjacent to each other are both protrusion points in FIG. 20. Further, it is assumed that a line segment BC connecting two anchor points (B and C) among four anchor points (A to D) on an evaluation-target character is disposed parallel with either the X or Y axis. Furthermore, in a case where contours extending from two anchor points (A and D) are line segments that are long in the direction perpendicular to the line segment BC, it is conceivable that the anchor points will be set at edge areas of a slender surface-type straight line. Accordingly, these four anchor points are erased and anchor points are set anew at points where the line segment BC intersects each of the long line segments. By using this method, anchor points can be reduced in number and file size can be reduced. Further, there are cases where a portion (protrusion point) at the corner of a scanned character develops a pixel defect owing to scanning noise. No matter how accurately such a character is vectorized, it will not be possible to express the shape originally possessed by the character. By using the method described, however, the corner originally possessed by the character can be reproduced.

In this embodiment, as described above, distortion that has occurred in a protruding area or recessed area can be reduced by setting anew or deleting anchor points, as illustrated in FIGS. 18 to 20.

Figure 21:
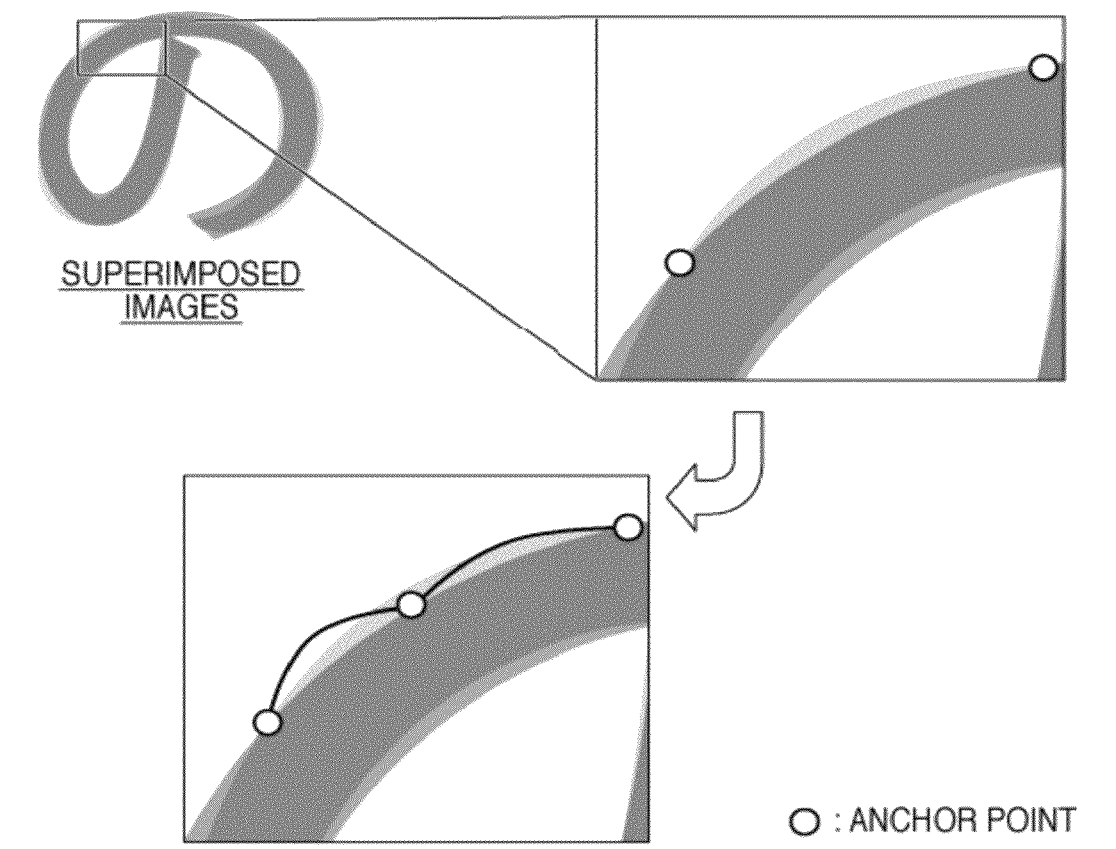
FIG. 21 is a diagram useful in describing a case where an anchor point has been set anew in a curved area.
Figure 22:
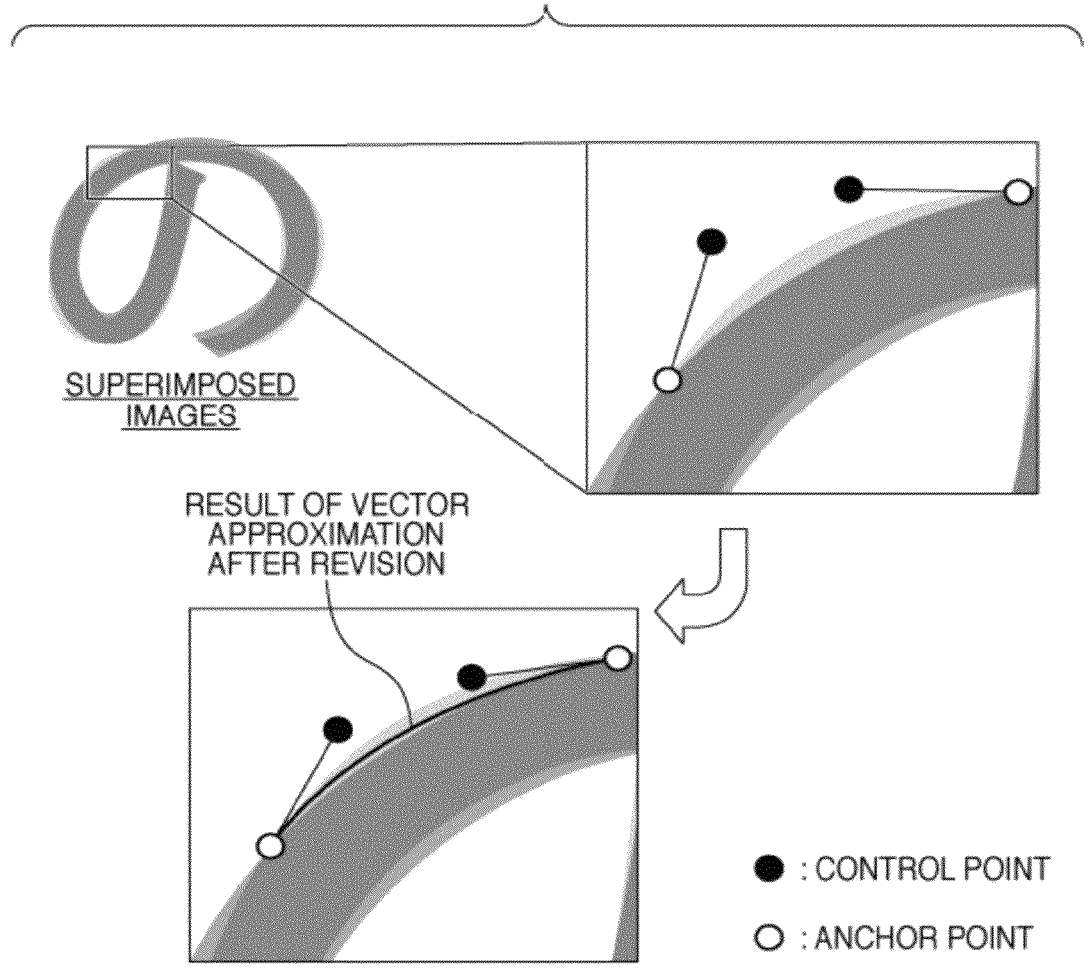
FIG. 22 is a diagram useful in describing a method of reducing distortion in a curved area.

Next, a method of reducing distortion in a curved area will be described. FIG. 21 is a diagram useful in describing a case where an anchor point has been set anew in a curved area in a manner similar to that shown in FIGS. 18 to 20. When an anchor point is set anew in a recessed area or protruding area, a depression is produced in the curve and quality declines, as shown in FIG. 21. If an anchor point is set anew in order to subdivide the depression produced, processing time is prolonged. FIG. 22 is a diagram useful in describing a method of reducing distortion in a curved area according to this embodiment. In this embodiment, distortion is reduced by moving control points, as shown in FIG. 22. More specifically, in a case where the contour of an evaluation-target character bulges outwardly in comparison with the contour of a reference character, as shown in FIG. 22, the control points are made to approach the side of the contour. An example of the distance of approach is half the distance between the control point and the contour of the reference character. Conversely, in a case where the contour of an evaluation-target character is on the inner side in comparison with the contour of a reference character, it is necessary to cause the evaluation-target character to bulge outwardly. As example of the distance moved is half the distance between the control point and the contour of the reference character.

Thus, in this embodiment as described above, distortion that has occurred in a curved area can be reduced by manipulating control points in the manner shown in FIG. 22.

Next, a method of reducing distortion in a linear surface area will be described. In the process of specifying a linear surface area from the contour of a reference character, as described in connection with FIG. 15, thickness is obtained. In this embodiment, therefore, anchor points are moved in such a manner that a corresponding area on the contour of the evaluation-target character takes on this thickness. As a result, distortion that has occurred in a linear surface area can be reduced.

Next, a method of reducing distortion in a linear approximation area will be described. As described above in connection with FIG. 9, distortion in a long linear approximation area approximates that of a straight line owing to the occurrence of distortion in a portion that should be a curve. In this embodiment, therefore, by performing a generally known curvilinear approximation that is a higher order function in which a cubic curve, for example, is applied between anchor points on an evaluation-target character, distortion that has occurred in a linear approximation area can be reduced. The applied curve is not limited to a cubic curve, and it may be so arranged that the approximation is performed using a higher order curve of degree 2 or higher (a curve of degree n, where $n \geq 2$ holds).

In this embodiment, as described above, distortion that has occurred in a linear surface area can be reduced by moving anchor points, and distortion that has occurred in a linear approximation area can be reduced by performing an approximation using a function of degree n.

In this embodiment, areas in which distortion is produced in the vectorization of a character are classified into five types and an optimum method of reducing distortion is applied in accordance with each type of area. As a result, distortion can be reduced more efficiently in terms of processing time and quality in comparison with the method of simply reducing difference amount between the contours of a reference character and evaluation-target character uniformly with regard to the entire character. Further, in this embodiment, the invention is described using a difference along the direction of a normal line as the measure of distortion. However, another measure may be used, such as a difference along the direction of the X or Y axis, so long as the difference between contours can be defined.

Further, the algorithm for reducing vectorization distortion efficiently in the foregoing description may be implemented using software or hardware or both software and hardware. For example, initial vectorization may be implemented by software. Since distortion reduction requires complicated processing, this may be implemented by hardware.

Further, in order to raise the speed of distortion reduction processing, it may be so arranged that resources that are idle in the entirety of the system are utilized in a suitable fashion. For example, two CPUs, one for block selection and one for vectorization, may be employed, and the memory may be a dual-port memory that the two CPUs can access simultaneously. During suspension of block selection processing, or upon completion thereof, the CPU for block selection can also be used for vectorization processing. In another conceivable example, if extremely complicated processing is executed in block selection processing situated ahead of vectorization processing, some or all of this processing may be implemented by hardware to real-time processing possible. If block selection implemented by hardware precedes vectorization processing, then time in which hardware resources allocated to block selection are not exploited may be available at the time of vectorization processing. It may be so arranged that these hardware resources can be exploited for vectorization processing at such time. Further, the distortion reduction applied to characters in this embodiment is not limited to characters and may be applied to vectorized line drawings and clip art.

In the foregoing embodiment, it may be so arranged that a system or apparatus is supplied with a computer-readable recording medium (also referred to as a storage medium) on which a program code of software for implementing the functions of a host and terminal has been recorded. In this case, a computer (or a CPU or MPU) of the system or apparatus may read and execute the program code that has been stored on the storage medium. In this case, the program code per se read from the storage medium implements the functions of the foregoing embodiment and the storage medium storing the program code would constitute the present invention. Examples of storage media for supplying program code are a ROM, a Floppy (registered trademark) disk, a hard disk, an optical disk, a magneto-optical disk, a CD-ROM, a CD-R, a magnetic tape and a non-volatile memory card, etc. Further, besides the case where the functions according to the embodiment are implemented by executing the read program code using a computer, an operating system or the like running on the computer may perform all or a part of the actual processing based upon the commands of the program code. There can also be cases where program code read from a storage medium is written to a memory provided on a function expansion board inserted into the computer or provided in a function expansion unit connected to the computer. Thereafter, a CPU or the like provided on the function expansion board or function expansion unit performs a part of or the entire actual processing based upon the commands of program code, and the functions of the above embodiment are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-033625, filed Feb. 14, 2008, which is hereby incorporated by reference herein in its entirety.

What is claimed is:

1. An image processing apparatus for addressing distortion in vectorizing an object contained in an image, comprising:
   a calculation unit configured to specify an evaluation-target area producing distortion in the object, and configured to calculate the amount of distortion produced in vectorization of the object by comparing the shape of the object and the shape of a vectorized object obtained by vectorizing the object in the specified evaluation-target area; and
   a revising unit configured to revise the shape of the vectorized object in the evaluation-target area so as to approach the shape of the object when the amount of distortion is larger than a predetermined reference value.

2. The apparatus according to claim 1, wherein said calculation unit calculates the amount of distortion based on a difference amount between a contour of the object and a contour of the vectorized object when the object and the vectorized object are superimposed.

3. The apparatus according to claim 2, wherein the difference amount between the contour of the object and the contour of the vectorized object is the distance along the direction of a normal line from a point of interest taken on one of the contours.

4. The apparatus according to claim 1, wherein said calculation unit adopts at least one of the following areas as the evaluation-target area and calculates the amount of distortion that is produced in this adopted evaluation-target area:
   a protruding area in which the contour of the object has a bend point at which the contour is bent into a protrusion;
   a recessed area in which the contour of the object has a bend point at which the contour is bent into a recess;
   a curved area in which the contour of the object has a curvature larger than a predetermined curvature between mutually adjacent bend points on the contour of the object;
   a first linearly shaped area in which the contour of the object is parallel to a center line, which is obtained by center-line processing of the object, between mutually adjacent bend points on the contour of the object; and
   a second linearly shaped area in which the contour of the vectorized object is a straight line having a length that is greater than half the length of whichever of vertical and horizontal lengths of a circumscribed rectangle, which circumscribes the vectorized object, is smaller.

5. The apparatus according to claim 4, wherein the bend point is a point at which the contour bends such that the angle of a pixel row situated on the contour of the object is greater than a predetermined angle.

6. The apparatus according to claim 4, wherein said revising unit revises the shape of the vectorized object so as to reduce the amount of distortion by generating new anchor points, or by deleting anchor points situated on the contour of the vectorized object, or by moving anchor points or control points situated on the contour of the vectorized object.

7. The apparatus according to claim 4, wherein said revising unit revises the shape of the vectorized object so as to reduce the amount of distortion by performing a curvilinear approximation in such a manner that a plurality of anchor points situated in the second linearly shaped area will be traversed.

8. An image processing method executed in an image processing apparatus for addressing distortion in vectorizing an object contained in an image, comprising:
   a calculation step of specifying an evaluation-target area that produces distortion in the object, and calculating amount of distortion produced in vectorization of the object by comparing the shape of the object and the shape of a vectorized object obtained by vectorizing the object in the specified evaluation-target area; and
   a revising step of revising the shape of the vectorized object in the evaluation-target area so as to approach the shape of the object when the amount of distortion is larger than a predetermined reference value.

9. A computer-readable recording medium on which has been recorded an image processing program for addressing distortion in vectorizing an object contained in an image, said program causing a computer to
   specify an evaluation-target area that produces distortion in the object, and calculate amount of distortion produced in vectorization of the object by comparing the shape of the object and the shape of a vectorized object obtained by vectorizing the object in the specified evaluation-target area; and
   revise the shape of the vectorized object in the evaluation-target area so as to approach the shape of the object when the amount of distortion is larger than a predetermined reference value.

* * * * *